(12) United States Patent
Dyess

(10) Patent No.: US 12,031,600 B2
(45) Date of Patent: Jul. 9, 2024

(54) VIBRATION ISOLATOR WITH HARD FRICTION BUSHING

(71) Applicant: Raytheon Company, Waltham, MA (US)

(72) Inventor: Jeremy Dyess, Tucson, AZ (US)

(73) Assignee: Raytheon Company, Tewksbury, MA (US)

( * ) Notice: Subject to any disclaimer, the term of this patent is extended or adjusted under 35 U.S.C. 154(b) by 57 days.

(21) Appl. No.: 17/808,640

(22) Filed: Jun. 24, 2022

(65) Prior Publication Data
US 2023/0417302 A1 Dec. 28, 2023

(51) Int. Cl.
*F16F 13/00* (2006.01)
*F16F 15/02* (2006.01)
*F16M 13/02* (2006.01)

(52) U.S. Cl.
CPC ............ *F16F 13/005* (2013.01); *F16F 13/00* (2013.01); *F16F 15/022* (2013.01); *F16F 2222/04* (2013.01); *F16F 2232/08* (2013.01); *F16M 13/02* (2013.01)

(58) Field of Classification Search
CPC ........ F16F 13/00; F16F 13/005; F16F 15/022; F16F 222/04; F16F 2232/08
See application file for complete search history.

(56) References Cited

U.S. PATENT DOCUMENTS

| | | | |
|---|---|---|---|
| 4,114,845 A * | 9/1978 | Weisenberger | F16F 1/54 248/677 |
| 4,141,527 A * | 2/1979 | Wolf | F16F 1/3732 248/562 |
| 4,674,725 A | 6/1987 | Popper | |
| 6,666,438 B2 * | 12/2003 | Nakagawa | F16F 1/3814 267/141.2 |
| 6,854,721 B2 | 2/2005 | Kato et al. | |

(Continued)

FOREIGN PATENT DOCUMENTS

| | | |
|---|---|---|
| KR | 101742040 B1 | 6/2017 |
| WO | 2015125996 A1 | 8/2015 |

OTHER PUBLICATIONS

International Search Report and Written Opinion issued for corresponding International Application No. PCT/US2023/015719, dated Jul. 25, 2023.

*Primary Examiner* — Eret C McNichols
(74) *Attorney, Agent, or Firm* — Schwegman Lundberg & Woessner, P.A.

(57) ABSTRACT

A vibration isolator includes a series of hard bushings that press against each other and slide, under the constraint of friction from the engagement of the bushings. A fastener, such as a bolt, passes through the engaged bushings, and one or more springs provide a spring force that maintains the engagement of the bushings. The bushings may include top and bottom bushings having chamfered surfaces, which engage corresponding upper and lower sloped surface on a middle friction bushing which can slide relative to the top and bottom bushings. The isolator may be part of a vibration isolation system that includes multiple isolators to provide isolation for an isolated object. The bushings may be made of metal or another suitable hard material. The isolator may be suitable in particular for vibration isolation in situations where vibrations are of severe, but short duration.

18 Claims, 3 Drawing Sheets

(56) References Cited

U.S. PATENT DOCUMENTS

| | | | |
|---|---|---|---|
| 6,889,946 B2* | 5/2005 | Bizaj | F16M 7/00 248/188.4 |
| 7,261,306 B2* | 8/2007 | Trotter | B60G 7/02 16/2.2 |
| 7,588,386 B2* | 9/2009 | Kielczewski | F16B 5/0233 403/14 |
| 8,511,637 B2* | 8/2013 | Mitsch | F01D 25/28 248/677 |
| 8,899,376 B2 | 12/2014 | Akimoto | |
| 8,939,437 B2* | 1/2015 | Kobori | F16F 1/3735 267/140.3 |
| 9,027,527 B2 | 5/2015 | Higashi et al. | |
| 9,285,067 B2* | 3/2016 | Hooghart | F16B 5/0225 |
| 9,551,120 B2 | 1/2017 | Annan | |
| 9,771,997 B2 | 9/2017 | Tsai | |
| 9,815,361 B2* | 11/2017 | Patel | F16F 1/3842 |
| 9,829,063 B2 | 11/2017 | Cho et al. | |
| 10,294,618 B2 | 5/2019 | Cho et al. | |
| 10,971,126 B1 | 4/2021 | Schmutz et al. | |
| 11,198,457 B2 | 12/2021 | Wike | |
| 11,276,435 B2 | 3/2022 | Chen et al. | |
| 11,527,227 B2* | 12/2022 | Gernhart | G10K 11/16 |
| 2006/0226622 A1* | 10/2006 | Trotter | F16F 1/3735 267/276 |
| 2008/0056809 A1* | 3/2008 | Kielczewski | F16B 5/0233 403/118 |
| 2009/0269157 A1* | 10/2009 | Spieth | F16B 31/028 411/10 |
| 2011/0193278 A1* | 8/2011 | Kobori | F16F 1/3735 267/141.1 |
| 2018/0223947 A1* | 8/2018 | Shepard | F16F 15/06 |

\* cited by examiner

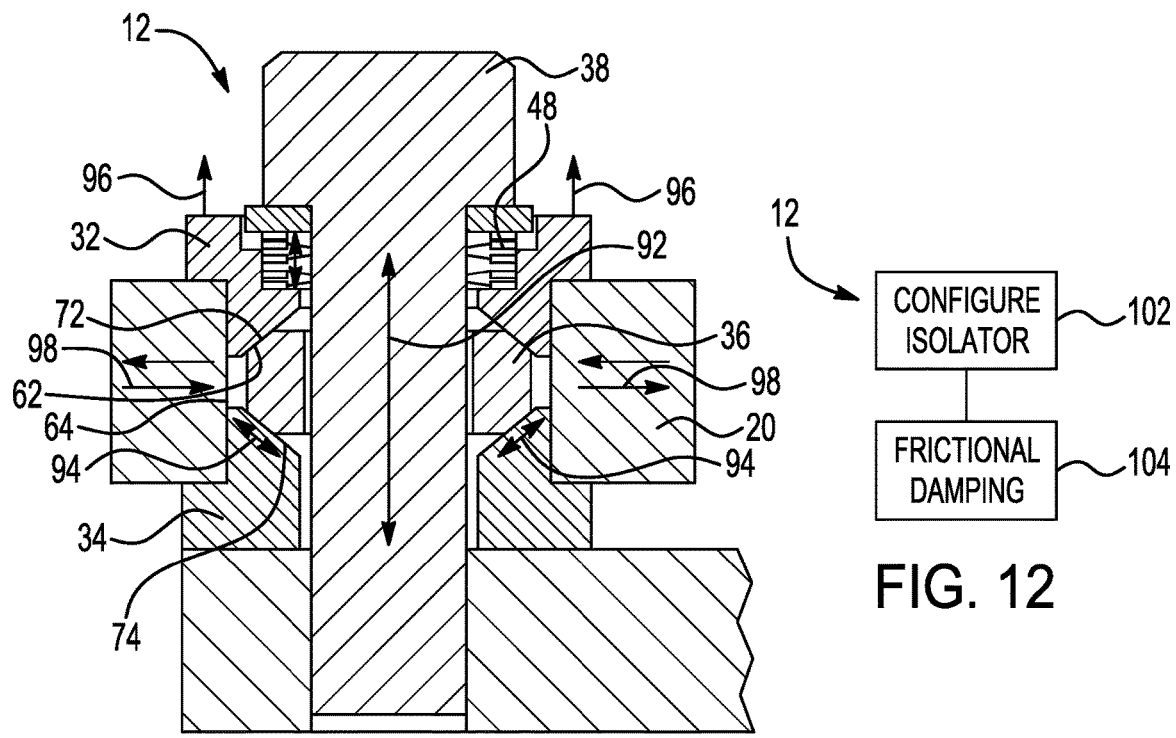
FIG. 11
FIG. 12
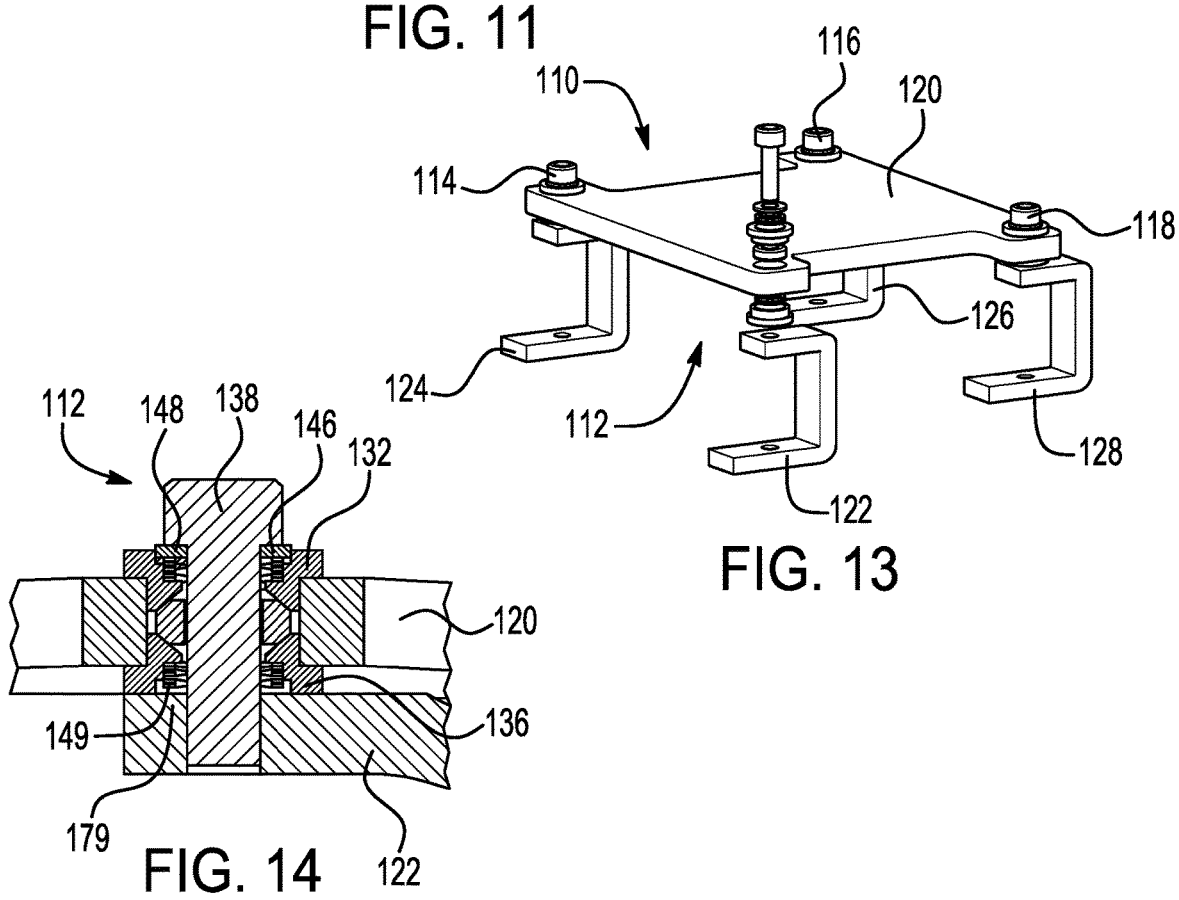
FIG. 13
FIG. 14

VIBRATION ISOLATOR WITH HARD FRICTION BUSHING

FIELD

The disclosure is in the field of vibration isolators, and systems and methods involving vibration isolators.

BACKGROUND

For current hypersonic airframes difficulties are encountered with isolating components inside the airframe as the temperatures swing from low temps at launch to high temps during extended flight. These temperature extremes make using elastomeric materials challenging, as the characteristics of the material change with temperature.

In addition, the use of JP-10 in air breathing systems jeopardizes the use of silicones and other elastomeric materials. Flexible material blends that do well with JP-10, such as fluorosilicone, are very stiff at low temps, and therefore do not work well.

SUMMARY

A vibration isolator includes bushings of hard material that rub against one another to damp vibrations.

According to an aspect of the disclosure, a vibration isolator includes: an upper bushing; a lower bushing; a friction bushing that is in contact with and slides relative to both the upper bushing and the lower bushing; and a fastener that passes through the upper bushing, the lower bushing, and friction bushing.

According to an embodiment of any paragraph(s) of this summary, the isolator further includes one or more springs that provide force to keep the upper bushing and the lower bushing engaged with the friction bushing.

According to an embodiment of any paragraph(s) of this summary, the upper bushing has an upper bushing chamfered surface that engages an upper sloped surface of the friction bushing.

According to an embodiment of any paragraph(s) of this summary, the lower bushing has a lower bushing chamfered surface that engages a lower sloped surface of the friction bushing.

According to an embodiment of any paragraph(s) of this summary, the upper sloped surface is parallel to the upper bushing chamfered surface, and the lower sloped surface is parallel to the lower bushing chamfered surface.

According to an embodiment of any paragraph(s) of this summary, the upper bushing chamfered surface and the lower bushing chamfered surface have a same chamfer angle.

According to an embodiment of any paragraph(s) of this summary, the chamfer angle is from 60 to 130 degrees.

According to an embodiment of any paragraph(s) of this summary, the chamfer angle is from 90 to 110 degrees.

According to an embodiment of any paragraph(s) of this summary, the chamfer angle is from 90 to 100 degrees.

According to an embodiment of any paragraph(s) of this summary, the friction bushing is mechanically coupled to a shaft of the bushing, such that the friction bushing moves along with the shaft.

According to an embodiment of any paragraph(s) of this summary, the isolator further includes a spring that maintains contact between the friction bushing, and the upper bushing and the lower bushing.

According to an embodiment of any paragraph(s) of this summary, the spring is a wave spring.

According to an embodiment of any paragraph(s) of this summary, the spring is a coil spring.

According to an embodiment of any paragraph(s) of this summary, the spring is located between the upper bushing and a head of the fastener.

According to an embodiment of any paragraph(s) of this summary, the isolator further includes a washer between the spring and the head of the fastener.

According to an embodiment of any paragraph(s) of this summary, the spring is located in a recess in the top bushing.

According to an embodiment of any paragraph(s) of this summary, the recess is a stepped recess having a wider portion and a narrower portion.

According to an embodiment of any paragraph(s) of this summary, the spring is in the narrower portion.

According to an embodiment of any paragraph(s) of this summary, the isolator further includes a washer between the spring and a head of the fastener, and the washer is too wide to enter the narrower portion of the recess.

According to an embodiment of any paragraph(s) of this summary, the bushings are all metal bushings.

According to an embodiment of any paragraph(s) of this summary, the upper bushing has an upper shoulder; the lower bushing has a lower shoulder; and the upper shoulder and the lower shoulder are used to clamp an isolated object therebetween.

According to an embodiment of any paragraph(s) of this summary, at least some of the bushings have surface coatings.

According to an embodiment of any paragraph(s) of this summary, the isolator further includes a lubricant at the contact between the friction bushing, and the upper bushing and the lower bushing.

According to an embodiment of any paragraph(s) of this summary, the bushings are all made of the same material.

According to an embodiment of any paragraph(s) of this summary, the fastener is a threaded fastener.

According to an embodiment of any paragraph(s) of this summary, the upper bushing and the lower bushing are made of the same material, and the friction bushing is made of a different material than the material of the upper bushing and the lower bushing.

According to another aspect, a vibration isolation system includes: vibration isolators coupling an isolated object to respective brackets; wherein each of the vibration isolators includes: an upper bushing; a lower bushing; a friction bushing that is in contact with and slides relative to both the upper bushing and the lower bushing; a fastener that passes through the upper bushing, the lower bushing, and friction bushing; and one or more springs that provide force to keep the upper bushing and the lower bushing engaged with the friction bushing.

According to yet another aspect, a method of vibration isolation includes: configuring a vibration isolator, wherein the vibration isolator includes: an upper bushing; a lower bushing; a friction bushing that is in contact with and slides relative to both the upper bushing and the lower bushing; a fastener that passes through the upper bushing, the lower bushing, and friction bushing; and one or more springs that provide force to keep the upper bushing and the lower bushing engaged with the friction bushing; and using the vibration isolator to frictionally damp vibrations at the contact between the friction bushing, and the upper bushing and the lower bushing.

According to an embodiment of any paragraph(s) of this summary, the configuring the vibration isolator includes controlling friction at the contact between the friction bushing, and the upper bushing and the lower bushing.

According to an embodiment of any paragraph(s) of this summary, the controlling friction includes one or more of selecting materials of the friction bushing and/or the upper bushing and the lower bushing; selecting surface roughness at the contact between the friction bushing, and the upper bushing and the lower bushing; and controlling a spring force used to maintain contact between the friction bushing, and the upper bushing and the lower bushing.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

FIG. 11 is a side sectional view of the vibration isolator of FIG. 3, illustrating movement and damping among the parts.

FIG. 12 is a high-level flow chart of a method according to an embodiment.

FIG. 13 an oblique, partially exploded view of a vibration isolation system, according to an embodiment.

FIG. 14 is a side sectional view of a portion of the system of FIG. 13.

DETAILED DESCRIPTION

A vibration isolator includes a series of hard bushings that press against each other and slide, under the constraint of friction from the engagement of the bushings. A fastener, such as a bolt, passes through the engaged bushings, and one or more springs provide a spring force that maintains the engagement of the bushings. The bushings may include top and bottom bushings having chamfered surfaces, which engage corresponding upper and lower sloped surface on a middle friction bushing which can slide relative to the top and bottom bushings. The isolator may be part of a vibration isolation system that includes multiple isolators to provide isolation for an isolated object. The bushings may be made of metal or another suitable hard material. The isolator may be suitable in particular for vibration isolation in situations where vibrations are of severe, but short duration, such as during launch or flight of hypersonic vehicles, spacecraft or missiles (to provide a few non-limiting examples), and where movement of the isolated object needs to be held to a minimum.

A vibration isolator with frictional engagement of bushings may be tuned to achieve desired isolation characteristics using any of a variety of variables. For example the variables may include selection of one or more of the materials of the various bushings; the surface characteristics of the sliding surfaces of the bushings (roughened or polished, for example); surface coatings of the sliding surfaces; presence, absence, and/or selection of lubricants between the sliding surfaces; spring characteristics of the one or more springs; and/or torque and/or force used in assembling the isolator.

Figure 1:
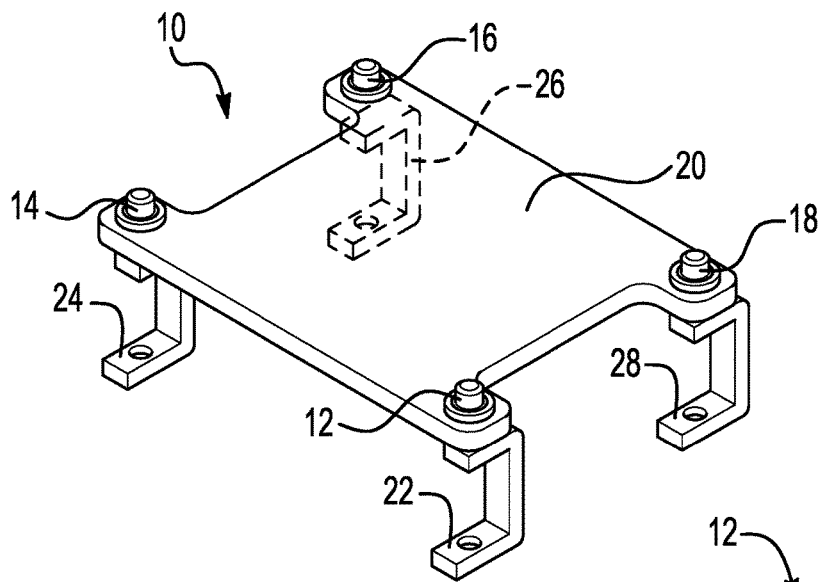
FIG. 1 is an oblique view of a vibration isolation system, according to an embodiment.

FIG. 1 shows a vibration isolation system 10 that includes vibration isolators 12, 14, 16, and 18. The isolators 12-18 are used to secure an isolated object 20 to a series of brackets 22, 24, 26, and 28, which in turn may be secured to structure (not shown) of a vehicle or other object. The isolated object 20 may be any sort of equipment which it is desired to isolate from vibrations of the structure of the vehicle or other object.

Figure 2:
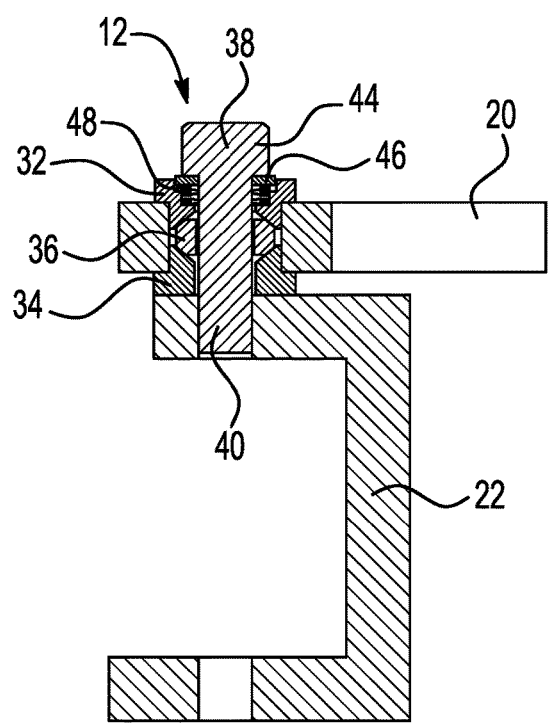
FIG. 2 is a side sectional view of a portion of the system of FIG. 1.
Figure 3:
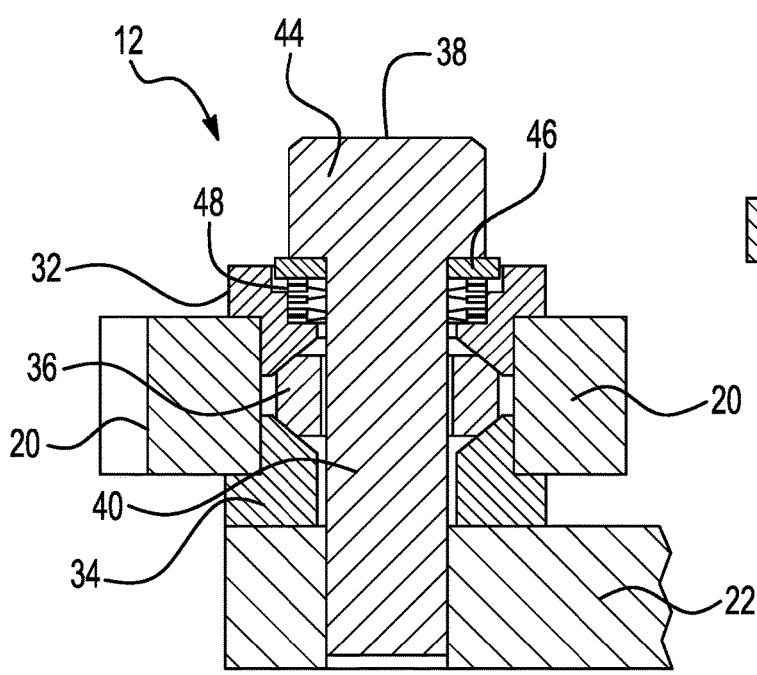
FIG. 3 is a side sectional view of the system of FIG. 1, focusing on one of the vibration isolators.

FIGS. 2 and 3 show further details of the vibration isolator 12. The vibration isolator 12 may be representative of the vibration isolators 12-18, in that all of the vibration isolators 12-18 may have substantially the same configuration.

The vibration isolator 12 includes an upper bushing 32 and a lower bushing 34, with a middle friction bushing (friction biscuit) 36 between the bushings 32 and 34. A fastener 38 is used to secure the stack of bushings 32-36 to the bracket 22, with a shaft 40 of the fastener 38 passing through central (smooth) holes in the bushings 32-36. A head 44 of the fastener 38 presses down on a washer 46, which in turn presses on a spring 48 that is between the washer 46 and the upper bushing 32. The upper bushing 32 and the lower bushing 34 clamp the isolated object 20 between them.

The fastener 38 may be a threaded fastener such as a bolt or a screw. The washer 46 may be a separate part, as in the illustrated embedment, or may be integrated with the fastener head 44.

Figure 4:
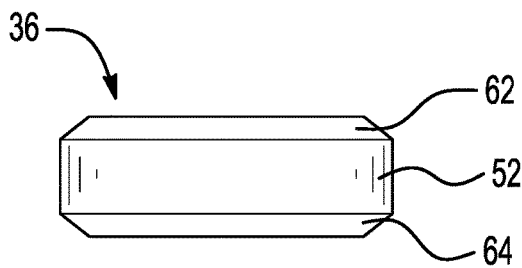
FIG. 4 is a side view of the friction bushing of the vibration isolator of FIG. 3.
Figure 5:
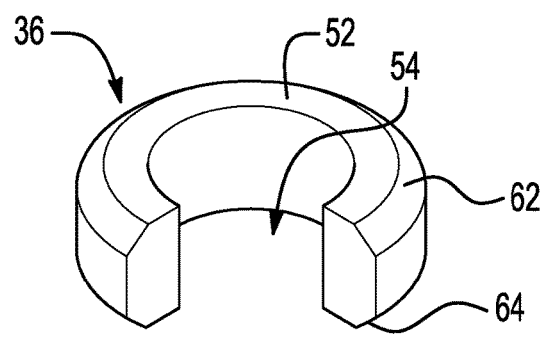
FIG. 5 is an oblique partial-cutaway view of the friction busing of FIG. 4.
Figure 6:
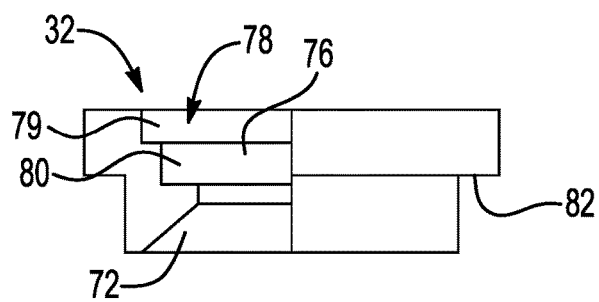
FIG. 6 is a side partial-cutaway view of the upper bushing of the vibration isolator of FIG. 3.
Figure 7:
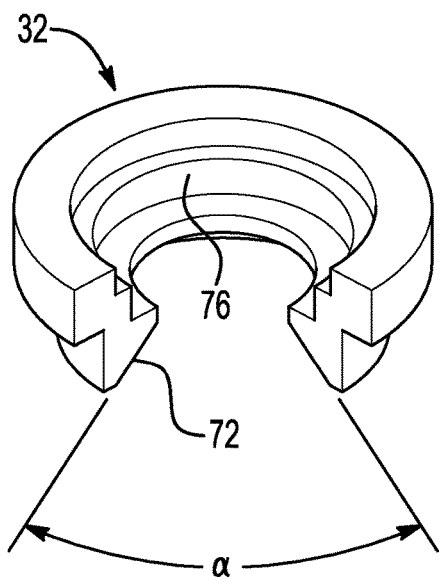
FIG. 7 is an oblique partial-cutaway view of the upper busing of FIG. 6.
Figure 8:
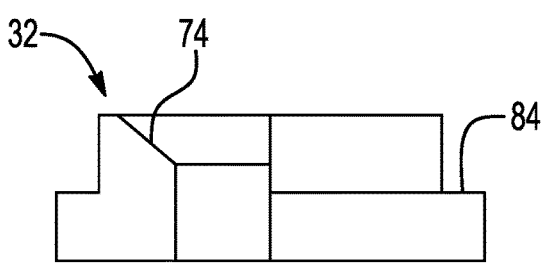
FIG. 8 is a side partial-cutaway view of the lower bushing of the vibration isolator of FIG. 3.
Figure 9:
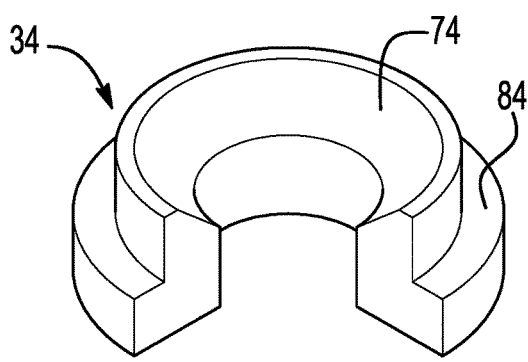
FIG. 9 is an oblique partial-cutaway view of the lower busing of FIG. 8.

With reference now in addition to FIGS. 4 and 5, the middle friction bushing 36 has a disk shape, with an annular ring 52 around a central hole 54. The central hole 54 is a close fit around the fastener shaft 40, such that movement of the fastener 38 also causes movement of the middle friction bushing 36. This may accomplished by having a tight tolerance fit between the friction bushing 36 and the fastener shaft 40, for example a diametric clearance of about 0.13 mm (0.0005"). This close fit between the middle friction busing 36 and the fastener shaft 40 engages the isolation/damping process of the isolator 12 (FIG. 2). The middle friction bushing 36 is also in direct contact with the upper bushing 32 and the lower bushing 34. This contact occurs on an upper sloped surface 62 and a lower sloped surface 64 of the middle bushing ring 52, which are on the outer perimeter of the ring 52, at the top and bottom of the ring 52.

Referring now also to FIGS. 6-9, a chamfered upper bushing surface 72 of the upper bushing 32 engages the middle bushing upper sloped surface 62 (FIG. 4). A chamfered lower bushing surface 74 of the lower bushing 34 engages the middle bushing lower sloped surface 64 (FIG. 4). The upper bushing 32 has a stepped seat 76 at a bottom of a recess 78. The recess 78 has a wider upper portion 79, and a narrower lower portion 80. The wider portion 79 may be configured to receive the washer 46 (FIG. 3), while the narrower portion 80 may be too small for receiving the washer 46, yet still be able to receive the spring 48 (FIG. 3).

The upper bushing 32 also has an upper bushing shoulder 82, and the lower bushing 34 has a lower bushing shoulder 84. The shoulders 82 and 84 are along the perimeters of the respective bushings 32 and 34, and are used for clamping the isolated object 20 (FIG. 2), as shown in FIG. 2 and described above.

The angles of all the sloped (ramped) surfaces, the middle bushing surfaces 62 and 64, and the chamfered surfaces 72 and 74, may all be the same, or substantially the same. The chamfer angle α for the chamfered surface 72 and 74 may be 60-130 degrees, may be 90-110 degrees, may be 90-100 degree, or may be about 100 degrees, to give non-limiting examples.

The bushings 32-36 may all be made of the same material, or may be made of different materials. The bushings 32-36 may be made of suitable metals, such as stainless steel, tool steels, aluminum, copper, or titanium, to give a few (non-limiting) examples. Alternatively some or all of the bushings 32-36 may be made of suitable non-metals, such as phenolic plastics or acetal plastics. It is desirable that the bushings 32-36 be made of a material that does not deform, since the isolator 12 (FIG. 2) relies on friction, rather deformation, for dispersing vibration energy.

Figure 10:
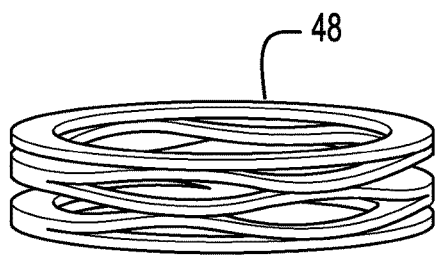
FIG. 10 is an oblique view of a spring of the vibration isolator of FIG. 3.

FIG. 10 shows one example of the spring 48, a wave spring. Other types of springs, such as a coil spring, may be used instead of the wave spring shown in FIG. 10. However wave springs have an advantage in providing symmetric force around the circumference of the spring 48.

FIG. 11 illustrates damping of vibrations by the isolator 12. Movement of the fastener 38 up and down (as depicted at reference number 92 in FIG. 11) causes similar up-and-down movement in the middle fiction bushing 36, which is in contact with and moves with the fastener 38. This motion is transmitted to the upper and lower bushings 32 and 34 along the contact surfaces, as indicated at reference number 94, driving the upper and lower bushings 32 and 34 away from another, as indicated at 96. Friction between the middle fiction bushing 36 and the upper and lower bushings 32 and 34 at their contact surfaces (the middle fiction bushing surfaces 62 and 64, and the chamfered surfaces 72 and 74) damps the relative movement of the upper and lower bushings 32 and 34 relative to the middle bushing 36. The spring 48 also damps and restrains the movement of the upper and lower bushings 32 and 34. Further, the spring 48 provides a force that keeps all the movable parts, most prominently the bushings 32-36, in contact with one another, preventing "clapping" between the parts. Movement of the isolated object 20, as indicated at reference number 98, may also be damped through the action of the other components, the bushings 32-36 and the spring 48.

The damping also occurs for movement of the fastener 38 and the fiction bushing 36 in other directions, such as forward/aft motions and side-to-side motions. Regardless of the source (origin) of the vibrations, the vibrations are damped by the isolator 12.

Many factors go into the damping that occurs in the movement of the parts as described above. For example the materials for the bushings 32-36, the surface finish of the bushings 32-36 (roughness), surface coatings and/or treatments of the bushings 32-36 (affecting friction), possible lubricants at the contact surfaces of the bushings 32-36 (e.g., dry film lubricants such as BONDERITE brand carbon spray or the like, which may be baked or heat cured onto a surface, or suitable greases, such as high-temperature petroleum-based grease), dimensions of the various parts (for example the angles of the contact surfaces between the bushings 32-36), the characteristics of the spring 48 (such as the spring constant or spring force of the spring 48), and/or the preload on the various parts. Depending on the desired damping conditions the isolator 12 may be appropriate configured by varying one or more of these factors.

FIG. 12 shows a high-level flow chart of a method 100 for vibration isolation, such as using the isolation system 10 (FIG. 1) or individual isolators such as the isolator 12 (FIG. 3). In step 102 the isolator 12 is configured, for example to obtain desirable damping through friction at the contact between the friction bushing 36 (FIG. 3), and the upper bushing 32 (FIG. 3) and the lower bushing 34 (FIG. 3). The configuring to obtain desired friction characteristics may include, to give non-limiting examples, selecting materials of the friction bushing 36 and/or the upper bushing 32 and the lower bushing 34; selecting surface roughness at the contact between the friction bushing 36, and the upper bushing 32 and the lower bushing 34; and controlling a spring force used to maintain contact of the friction bushing 36 with the upper bushing 32 and the lower bushing 34.

In step 104 the vibration isolator 12 (FIG. 3) is used to frictionally damp vibrations at the contact between the friction bushing 36 (FIG. 3), and the upper bushing 32 (FIG. 3) and the lower bushing 34 (FIG. 3). The frictional damping process may proceed, for example, as described above with regard to FIG. 11.

The isolator 12 (FIG. 3) and the isolator system 10 (FIG. 1) provide advantages. They avoid use of flexible materials such as elastomers, which may be unsuitable for use in some material environments (in the presence of JP-10 fuel, for example, which causes elastomers to degrade). Also, the isolator 12 can be used in situations where there is a desire to greatly limit movements of the isolated object 20, such as when there is little clearance between parts of a vehicle. Further, the isolator 12 may be useful in attenuating large vibrations over a small time scale, such as during launch of a hypersonic vehicle, spacecraft, or missile, since there in such a situation some alteration of the damping friction between the bushings may be acceptable for providing only short-term damping.

FIGS. 13 and 14 illustrate an alternative embodiment, a vibration isolation system 110 that includes vibration isolators 112, 114, 116, and 118, for securing an isolated object 120 to a series of brackets 122, 124, 126, and 128. Details of the isolator 112 are shown in FIG. 14.

Many of the details of the isolator 112 is similar to those of corresponding parts of the isolator 12 (FIG. 3). The upper bushing 132, the middle friction bushing (biscuit) 136, the fastener 138, the washer 146, and the spring 148 are all the same as their corresponding parts of the isolator 12. The lower bushing 134 is similar to the bushing 34 (FIG. 3) in many respects, but has a recess 179 to accommodate a second spring 149 that is between the lower bushing 134 and the bracket 122. The second spring 149 may be similar to (or identical to) the spring 148, or may have different characteristics than the spring 148. The use of the two springs 148 and 149 may provide increased symmetry for the isolator 112, and thus may improve performance.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A vibration isolator comprising
   an upper bushing;
   a lower bushing;
   a friction bushing that is in contact with and slides relative to both the upper bushing and the lower bushing; and
   a fastener having a shaft that passes through the upper bushing the lower bushing, and the friction bushing, wherein the friction bearing is a close fit around the fastener shaft,
   wherein the upper bushing has an inward-facing upper bushing chamfered surface that engages an upper sloped surface of the friction bushing;
   wherein the lower bushing has an inward-facing lower bushing chamfered surface that engages a lower sloped surface of the friction bushing,
   wherein the friction bushing is captured between the upper and lower bushings and the shaft of the fastener.

2. The vibration isolator of claim 1, wherein the upper sloped surface is parallel to the upper bushing chamfered surface, and the lower sloped surface is parallel to the lower bushing chamfered surface.

3. The vibration isolator of claim 1, wherein the upper bushing chamfered surface and the lower bushing chamfered surface have a same chamfer angle.

4. The vibration isolator of claim 3, wherein the chamfer angle is from 60 to 130 degrees.

5. The vibration isolator of claim 1, wherein the bushings are all metal bushings.

6. The vibration isolator of claim 1, wherein the fastener is a threaded fastener.

7. A vibration isolator comprising
   an upper bushing;
   a lower bushing;
   a friction bushing that is in contact with and slides relative to both the upper bushing and the lower bushing; and
   a fastener having a shaft that passes through the upper bushing, the lower bushing, and the friction bushing,
   wherein the friction bushing is mechanically coupled to the shaft of the fastener, such that movement of the fastener causes movement of the friction bushing.

8. A vibration isolator comprising
   an upper bushing having an upper shoulder;
   a lower bushing having a lower shoulder;
   a friction bushing that is in contact with and slides relative to both the upper bushing and the lower bushing;
   a fastener that passes through the upper bushing, the lower bushing, and the friction bushing; and
   a spring located between the upper bushing and a head of the fastener that maintains contact between the friction bushing, the upper bushing and the lower bushing.

9. The vibration isolator of claim 8, wherein the spring is a wave spring.

10. The vibration isolator of claim 8, wherein the spring is a coil spring.

11. The vibration isolator of claim 8, wherein the spring is located in a recess in the top bushing.

12. The vibration isolator of claim 11,
    wherein the recess is a stepped recess having a wider portion and a narrower portion; and
    wherein the spring is in the narrower portion.

13. The vibration isolator of claim 12,
    further comprising a washer between the spring and a head of the fastener;
    wherein the washer is too wide to enter the narrower portion of the recess.

14. A vibration isolator comprising
    an upper bushing having an upper shoulder;
    a lower bushing having a lower shoulder;
    a friction bushing that is in contact with and slides relative to both the upper bushing and the lower bushing; and
    a fastener that passes through the upper bushing, the lower bushing, and the friction bushing,
    wherein the upper shoulder and the lower shoulder are used to clamp an isolated object therebetween.

15. A vibration isolator system comprising:
    vibration isolators coupling an isolated object to respective brackets;
    wherein each of the vibration isolators includes
       an upper bushing having an upper shoulder;
       a lower bushing having a lower shoulder;
       a friction bushing that is in contact with and slides relative to both the upper bushing and the lower bushing;
       a fastener having a shaft that passes through the upper bushing, the lower bushing, and the friction bushing; and
       one or more springs located between the upper bushing and a head of the fastener that provide force to keep the upper bushing and the lower bushing engaged with the friction bushing,
       wherein the upper bushing has an inward-facing upper bushing facing chamfered surface that engages an upper sloped surface of the friction bushing and the lower bushing has an inward-facing lower bushing chamfered surface that engages a lower sloped surface of the friction bushing such that the friction bushing is captured between the upper and lower bushings and the shaft of the fastener;
       wherein the friction bushing is mechanically coupled to the shaft of the fastener such that movement of the fastener causes movement of the friction bushing;
       wherein the upper bushing's upper shoulder and the lower bushing's lower shoulder are used to clamp the isolated object therebetween.

16. A method of vibration isolation, the method comprising:
    configuring a vibration isolator, wherein the vibration isolator includes:
       an upper bushing;
       a lower bushing;

a friction bushing that is in contact with and slides relative to both the upper bushing and the lower bushing;

a fastener having a shaft that passes through the upper bushing, the lower bushing, and friction bushing; and one or more springs that provide force to keep the upper bushing and the lower bushing engaged with the friction bushing, wherein the friction bushing is mechanically coupled to the shaft of the fastener such that movement of the fastener causes movement of the friction bushing; and using the vibration isolator to frictionally damp vibrations at the contact between the friction bushing, and the upper bushing and the lower bushing.

17. The method of claim 16, wherein the configuring the vibration isolator includes controlling friction at the contact between the friction bushing, and the upper bushing and the lower bushing.

18. The method of claim 17, wherein the controlling friction includes one or more of selecting materials of the friction bushing and/or the upper bushing and the lower bushing; selecting surface roughness at the contact between the friction bushing, and the upper bushing and the lower bushing; and controlling a spring force used to maintain contact between the friction bushing, and the upper bushing and the lower bushing.

* * * * *